(12) United States Patent
Muttik

(10) Patent No.: US 10,904,218 B2
(45) Date of Patent: Jan. 26, 2021

(54) SECURE PROXY TO PROTECT PRIVATE DATA

(71) Applicant: McAfee, Inc., Santa Clara, CA (US)

(72) Inventor: Igor Muttik, Berkhamsted (GB)

(73) Assignee: McAfee, LLC, San Jose, CA (US)

( * ) Notice: Subject to any disclaimer, the term of this patent is extended or adjusted under 35 U.S.C. 154(b) by 109 days.

(21) Appl. No.: 15/026,095

(22) PCT Filed: Nov. 25, 2013

(86) PCT No.: PCT/US2013/071718
§ 371 (c)(1),
(2) Date: Mar. 30, 2016

(87) PCT Pub. No.: WO2015/076846
PCT Pub. Date: May 28, 2015

(65) Prior Publication Data
US 2016/0330172 A1   Nov. 10, 2016

(51) Int. Cl.
*H04L 29/06* (2006.01)
*G06F 21/62* (2013.01)

(52) U.S. Cl.
CPC ...... *H04L 63/0281* (2013.01); *G06F 21/6245* (2013.01); *H04L 63/08* (2013.01);
(Continued)

(58) Field of Classification Search
CPC .. H04L 63/08; H04L 63/0815; H04L 63/0281
See application file for complete search history.

(56) References Cited

U.S. PATENT DOCUMENTS 5,987,610 A   11/1999 Franczek et al.
6,073,142 A    6/2000 Geiger et al.
(Continued)

FOREIGN PATENT DOCUMENTS

EP   2226988      9/2010
JP   H11120238 A  4/1999
(Continued)

OTHER PUBLICATIONS

Extended European Search Report from Application No. 13897971.1, dated Jul. 11, 2017; 10 pages.
(Continued)

*Primary Examiner* — Jason K Gee
(74) *Attorney, Agent, or Firm* — Patent Capital Group

(57) ABSTRACT

Technologies are provided in embodiments to protect private data. Embodiments are configured to intercept a network flow en route from a server to a client device, identify a request for a private data item in an object of the network flow, identify the private data item in a data store, provide, to the client device, a modified object including an authorization request, and send the private data item to the server when valid authorization information is received. Embodiments are also configured to receive authorization information from the client device, determine whether the authorization information is valid, and obtain the private data item if the authorization information is determined to be valid. Embodiments may also be configured to determine an unlocking mechanism for the private data item, and create a modified object including the authorization request based, at least in part, on the unlocking mechanism.

24 Claims, 6 Drawing Sheets

(52) U.S. Cl.
CPC ........ *H04L 63/0876* (2013.01); *H04L 63/101* (2013.01); *H04L 63/168* (2013.01)

(56) References Cited

U.S. PATENT DOCUMENTS

| | | | |
|---|---|---|---|
| 6,460,050 B1 | 10/2002 | Pace et al. | |
| 7,444,512 B2 | 10/2008 | Brickell | |
| 7,506,155 B1 | 3/2009 | Stewart et al. | |
| 7,849,308 B2 | 12/2010 | Suga | |
| 7,971,234 B1 | 6/2011 | Sussland et al. | |
| 8,375,221 B1* | 2/2013 | Thom | G06F 21/57 713/189 |
| 9,143,519 B2 | 9/2015 | Teddy et al. | |
| 9,311,480 B2 | 4/2016 | Teddy et al. | |
| 9,614,865 B2 | 4/2017 | Teddy et al. | |
| 10,469,533 B2 | 11/2019 | Ylonen et al. | |
| 2002/0087894 A1* | 7/2002 | Foley | H04L 63/083 726/4 |
| 2005/0021975 A1* | 1/2005 | Liu | H04L 63/0823 713/182 |
| 2008/0059804 A1* | 3/2008 | Shah | G06F 21/41 713/186 |
| 2008/0109912 A1* | 5/2008 | Rivera | G06F 21/6209 726/30 |
| 2008/0276098 A1 | 11/2008 | Florencio et al. | |
| 2008/0320310 A1 | 12/2008 | Florencio et al. | |
| 2011/0287739 A1 | 11/2011 | Cajigas Bringas et al. | |
| 2013/0205134 A1* | 8/2013 | Holtmanns | H04W 4/50 713/156 |
| 2013/0276082 A1* | 10/2013 | Kuang | H04L 63/0869 726/7 |
| 2013/0305327 A1 | 11/2013 | Shen et al. | |

FOREIGN PATENT DOCUMENTS

| | | |
|---|---|---|
| JP | 2001142768 A | 5/2001 |
| JP | 2005-275690 | 10/2005 |
| JP | 2008186201 A | 8/2008 |
| JP | 2009510644 A | 3/2009 |
| WO | WO 2015/076846 A1 | 11/2013 |

OTHER PUBLICATIONS

Nonfinal Notification of Reasons for Rejection in JP Application No. 2016-520084, dated May 30, 2017, with English translation, 3 pages.

International Search Report and Written Opinion in International Application No. PCT/US2013/071718, dated Aug. 22, 2014, 12 pages.

Notice of Preliminary Rejection in corresponding Korean Patent Application No. 2016-7010764, dated Oct. 12, 2017, with English translation, 11 pages.

Notice of Allowance in corresponding Korean Patent Application No. 10-2016-7010764, dated Mar. 13, 2018, with English translation, 3 pages.

PRC Jun. 21, 2018 First Office Action for counterpart Chinese Application No. 201380080404.X dated Jun. 21, 2018; (Includes English translation); 14 pages.

EPO Dec. 5, 2018 Intention to Grant Patent from counterpart European Application No. 13897971.1 dated Dec. 5, 2018; 44 pages.

JPO Dec. 27, 2018 Notification of Reasons for Refusal from Japanese Patent Application No. 2017-232194, Machine Translation included; 6 pages.

Sep. 19, 2019 Reasons for Refusal from Japanese Application JP2017232194; 3 pages.

Jun. 30, 2020—Decision of Refusal from Japanese Application JP2017232194; 3 pages.

* cited by examiner

SECURE PROXY TO PROTECT PRIVATE DATA

CROSS-REFERENCE TO RELATED APPLICATION

This application is a National Stage application under 35 U.S.C. 371 of International Application PCT/US2013/071718, filed on Nov. 25, 2013, and entitled "SECURE PROXY TO PROTECT PRIVATE DATA". The disclosure of the prior application is considered part of and is incorporated by reference in the disclosure of this application.

TECHNICAL FIELD

This disclosure relates in general to the field of computer network security, and more particularly, to providing a secure proxy to protect private data.

BACKGROUND

The field of computer security has become increasingly important in today's society. Users around the world operate various types of client devices to browse the Internet each day. Client devices can be configured with software (e.g., a web browser) to access the Internet through various public and/or private networks. Networks providing access to the Internet by client devices are numerous and can include, for example, private enterprise networks, home networks, public networks provided in business establishments, cellular networks, school or campus networks, etc.

Maintaining privacy and security of information when browsing the Internet via a client device is a significant concern. Users of client devices often provide private data, via a user interlace of the client device, when accessing web servers and other systems through the Internet. Certain malicious software ("malware") specifically targets private data entered by a user through a browser to access the Internet. Such malware can be configured to intercept the private data in the browser and pilfer the data. Malware can also be configured to intercept private data, such as authentication credentials, provided by embedded devices, client applications, and password managers to automatically authenticate to services provided over a network. Depending on the particular data that is pilfered, any number of unauthorized, and even illegal, activities could be undertaken. Thus, network security administrators and individuals alike face significant challenges in protecting client devices from malicious persons who seek to misappropriate private data from the client devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Figure 1:
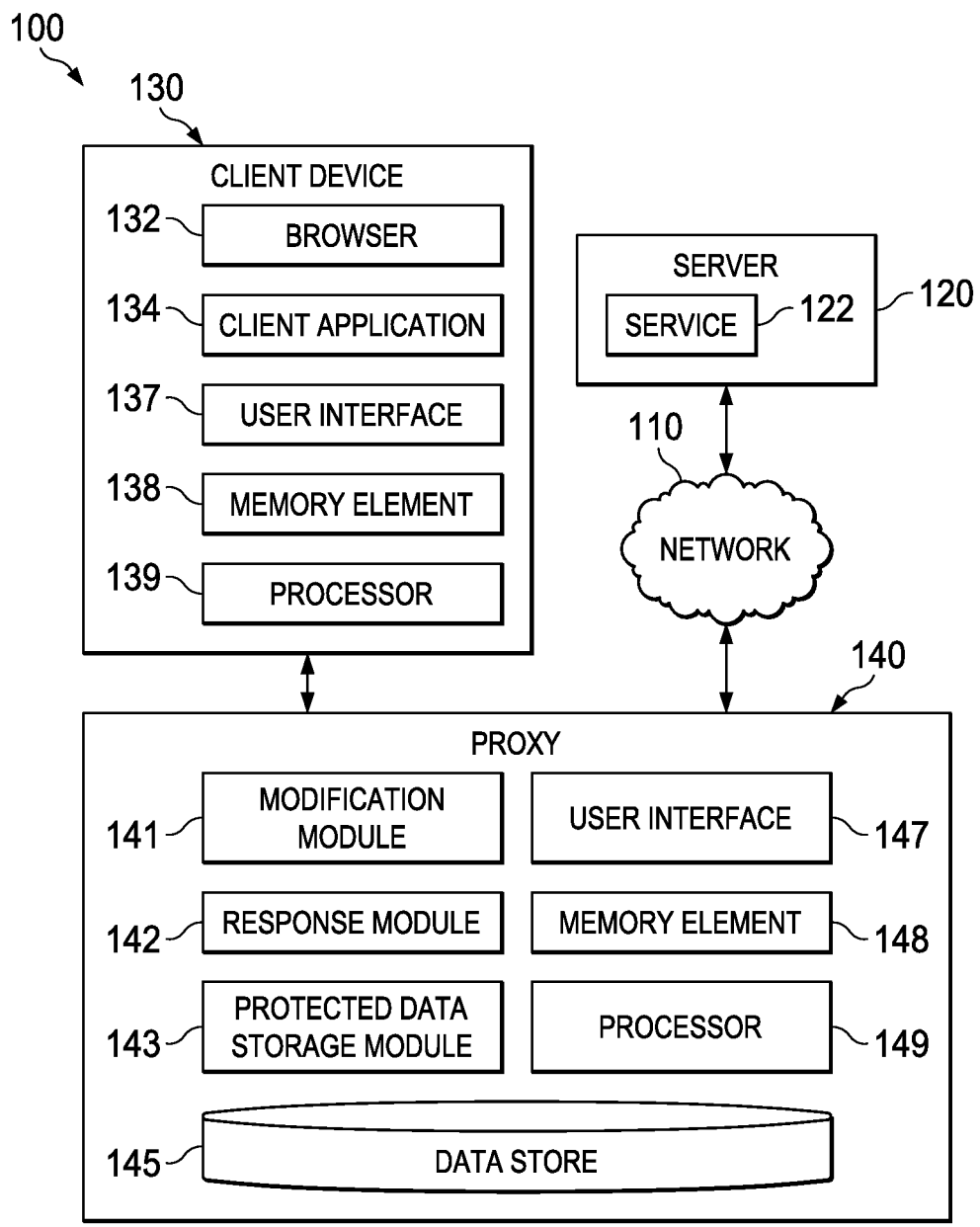
FIG. 1 is a simplified block diagram of an example network environment in which private data is protected in accordance with an embodiment of the present disclosure.

FIG. 1 is a simplified block diagram of an example network environment 100 in which a system for protecting private data is implemented. Private data can include, but is not limited to, credentials used to authenticate to services provided aver a network data entered by a user on an client device when browsing the Internet). Network environment 100 includes a network 110, a server 120, a client device 130, and a proxy 140. Proxy 140 can include appropriate hardware such as, but not limited to, a memory element 148, and a processor 149. In some embodiments, proxy 140 may also include a user interface 147 through which a user can interact with proxy 140. A data store 145 may be integrated with proxy 140 or may be external to proxy 140, for storing private data such as user names, passwords, and other information designated as private data. A protected data storage module 143 can be configured to enable the population of data store 145. Proxy 140 also includes one or more modules configured to protect the private data stored in data store 145. In at least one embodiment, these modules can include modification module 141 and response module 142. Client device 130 is a device capable of initiating electronic communication with other nodes, such as server 120 and proxy 140. In some embodiments, client device 130 includes a browser 132, a user interface 137, a memory element 138, and a processor 139. In some embodiments, client device 130 includes a client application 134 that is configured to automatically authenticate to a server, such as server 120. Server 120 includes a service 122, which can provide resources to client device 130.

Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. As an example, client device 130 may be an embedded controller without a user interface, which communicates with server 120 without a browser. Network environment 100 may include a configuration capable of transmission control protocol/internet protocol (TCP/IP) communications for the transmission and/or reception of packets in a network. Network environment 100 may also operate in conjunction with a user datagram protocol/IP (UDP/IP) or any other suitable protocol, where appropriate and based on particular needs.

For purposes of illustrating certain example techniques of a system for protecting private data, it is important to understand the activities that may be occurring in network environment 100. The following foundational information may be viewed as a basis from which the present disclosure may be properly explained.

Client devices, such as mobile phones, laptops, desktops, gaming systems, tablets, embedded controllers, smart sensors, car infotainment systems, etc, are typically configured to communicate to network servers and other systems via a networking infrastructure such as the Internet. A browser is a software application used for accessing web pages via the Internet. A browser can be used to obtain, present, and traverse information resources offered by a web server. Browsers are typically configured to access information using Hypertext Transfer Protocol (HTTP) to receive and transmit data. Of course, any application can communicate via HTTP directly without employing the browser. Other protocols can also be used to disseminate information over the Internet including, for example, SPDY protocol, file transfer protocol (FTP), simple messaging transfer protocol (SMTP), and various other protocols and data formats such as Extensible Markup Language (XML), Asynchronous JavaScript and XML (AJAX), Simple Object Access Protocol (SOAP), JavaScript Object Notation (JSON), RESTful, etc.

Users of client devices often provide private data, including credentials such as a username and password, through their client devices (e.g., user input via a user interface, input accessed from stored data) in order to gain access to content and services of web servers and other systems. Users may also provide various other private data requested by a web server or other system, for example, to provide a service. A human user can drive or operate some form of software browsers, network facing applications) in order to interact with a client device to access resources and services over a network. A 'service' is intended to include any combination of programming and data made available from a server to a client device. As used herein, the term 'private data' is intended to include any data or information a user or entity desires to keep confidential. Private data can include passwords, pass phrases, usernames, personal identification numbers (Ms), and any other data used to gain authorized access to content and services of a web server or other system. Private data can also include any other data or information designated by a user or entity including, but not limited to, account numbers (e.g., financial, health, school, etc.), credit card numbers, personal data (e.g., gender, weight, etc.), social security numbers, home address, particular photographs, etc.

Maintaining privacy and security of private data when communicating with web servers and other systems presents significant problems. Hypertext Markup Language (HTML) protocol is a common protocol used with HTTP to provide web pages to users that can request entry of private data such as usernames and passwords. When unencrypted private data is provided through a browser of a client device into an HTML form, for example, the data is in its native form and may be sent to a server in its native form. The native form can include, for example, data provided to a client device through key presses or buttons, drop down menus to select characters, auto-filling from a storage location, etc. Thus, the private data is visible on the client device. Even if communication between a client device and server is encrypted (e.g. via IMPS protocol), the private data initially provided to the browser is still in its native form and, therefore, is visible on the client device and may be susceptible to interception by malware, hardware keyloggers, etc. The private data is visible and/or accessible prior to the browser encrypting the communication.

In some cases, software may be used to automatically fill in a form, such as an HTML form provided by a web server, with requested information. Password vaults (password concentrators) may also be used to inject passwords into HTML forms requesting a password, without requiring a user to manually enter it each time the form that requests the password is presented. Some browsers are also configured to 'remember' a password, recognize subsequent requests for the same password, and automatically provide the password when requested. Additionally, some external software has similar functionality. In these solutions, however, the end result is some type of software that, instead of the user, injects private data into a form. This private data is at risk of being intercepted and misappropriated. Similarly, other protocols (e.g., SPDY, FTP, SMTP, TELNET, etc.) may also request entry of private data during network communications with a client device. Private data provided in response to such requests, either manually or automatically, may also be at risk of interception and misappropriation. Even encrypted protocols like HyperText Transfer Protocol Secure (HTTPS), FTP Secure (FTPS), Secure Shell (SSH), and SSH File Transfer Protocol (SFTP) only protect the data in transit but not before it is encrypted.

Certain malware is designed to infect a client device in order to steal information from the client device and/or a user of the client device. Key logger malware, for example, is designed to run in a computer to record all key presses. Another class of malware is referred to as man-in-the-browser, which is a malicious browser extension that can intercept data a user puts into the browser, or that is otherwise injected into the browser (e.g., by software). In particular, password vaults that populate a web form directly can leak passwords via man-in-the-browser attacks. Current approaches to protecting data entered into a browser, however, rely on browser modification (hardening), which can be costly.

A system for protecting private data in a network environment, as outlined in FIG. 1, can resolve these issues and others. In network environment 100 of FIG. 1, a proxy is configured to modify, on the fly, an object (e.g., HTML web page) that is sent to a client device from a server (e.g., a web server) and that requests private data (e.g., username, password, etc.). The modified object includes a request for authorization to unlock (i.e., access/obtain) the relevant private data and provide the private data to the requesting server. The proxy provides the client device with the modified object containing the authorization request. In at least some embodiments, the relevant private data can be stored inside the proxy, which can be operated in a secure environment. Once the authorization is received from the client device, the proxy can obtain the private data and send a response to the server with the private data. In some instances, the proxy can insert the private data directly into the original object, and upload the filled-in original object (e.g., an HTTP POST form) to the server.

For ease of illustration, several embodiments herein are described in the context of the system for protecting private data that is requested and provided in a particular type of object (or server transmission): HTML web pages. HTML web pages, which can include HTML forms, are provided by a web server to a client device. Some HTML web pages include a request for private data to be provided in response. The broad teachings of the various embodiments of the system for protecting private data described herein, however, can be applied in any communication protocol that is used as a medium to transmit the private data. Thus, the term 'object' is intended to include any file or data that can be formatted for transmission (e.g., HTML, XML, FTP, SMTP, SPDY, Webmail, etc.) and configured to allow input of requested data, or other response with the requested data. For example, an object could enable a user to input the requested data via a screen of a client device, or could enable a client device or client application to generate a response with the requested data (e.g., a client device or client application that authenticates automatically to a web service). A 'client application' as used herein, is intended to mean a computer program or a group of computer programs that can be executed on a client device by one or more processors to perform certain tasks, and that may include software, code, logic, instructions, functions, algorithms, etc. These tasks include providing private data to services over a network, such as automatically authenticating to a service.

Turning again to FIG. 1, network environment 100 provides a system for protecting private data during network communications between client devices and web servers (or other systems). Before discussing potential flows associated with the architecture of FIG. 1, a brief discussion is provided about some of the possible components and infrastructure that may be associated with network environment 100.

Generally, network environment 100 can include any type or topology of networks, indicated by network 110. Network 110 represents a series of points or nodes of interconnected communication paths for receiving and sending network communications that propagate through network environment 100. Network 110 offers a communicative interface between nodes, and may be configured as any local area network (LAN), virtual local area network (VLAN), wide area network (WAN) such as the Internet, wireless local area network (WLAN), metropolitan area network (MAN), Intranet, Extranet, virtual private network (VPN), and any other appropriate architecture or system that facilitates communications in a network environment, or any suitable combination thereof, including wireless (e.g., 3G/4G/5G/nG network, WiFi, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wire line (e.g., Ethernet, etc.) communication. Generally, any suitable means of communication may be used: electric, sound, light, infrared, radio (e.g., Wifi, Bluetooth or NFC).

Network flows (also referred to as 'network communications' and 'network transmissions'), which can be inclusive of packets, frames, signals, data, objects, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Connections may be made via software defined networks (SDN) in a dynamic fashion. The term 'data' as used herein, refers to any type of binary, numeric, voice, video, textual, photographic, or script data, or any type of source or object code, or any other suitable information in any appropriate format that may be communicated from one point to another in computing devices (e.g., client devices, servers, proxies) and/or networks. Additionally, messages, requests, responses, replies, queries, etc. are forms of network flows.

A client device, such as client device 130, is intended to represent any type of computing device that can be used to initiate network communications in a network environment and from which private data can be communicated. In some embodiments, a client device can be associated with an end user wishing to establish a network session in network environment 100 via some network. The term 'client device' is also intended to include any type of computing device that communicates with a server in a network environment without user interaction (e.g., an embedded controller that automatically authenticates to services over a network, a computing device with a client application that automatically authenticates to services over a network). Client devices can include, but are not limited to, workstations, terminals, laptops, desktops, tablets, gaming systems, mobile devices, smartphones, smart sensors, infotainment systems, embedded controllers, smart appliances, global positioning systems (GPS), or any other device, component, or element capable of initiating voice, audio, video, media, or data exchanges within network environment 100. In some embodiments, client device 130 may also be inclusive of a suitable interface (e.g., user interface 137) to a human user, such as a display, a keyboard, a touchpad, a remote control, other terminal equipment, or any suitable combination thereof.

A proxy, such as proxy 140, is a network element that acts as an intermediary for communications between a client device and a web server (or other computing device or system). As used herein, the term 'network element' is meant to encompass routers, switches, gateways, bridges, loadbalancers, firewalls, inline service nodes, proxies, servers, processors, modules, SDN controller/switch, or any other suitable device, component, element, or proprietary appliance operable to exchange information in a network environment. This network element may include any suitable hardware, software, firmware, components, modules, interfaces, or objects that facilitate the operations thereof. This may be inclusive of appropriate algorithms and communication protocols that allow for the effective exchange of data or information. Proxy 140 may be included into any network element.

In some embodiments, proxy 140 can be separate from client device 130, as illustrated in FIG. 1, and can be implemented anywhere between client device 130 and server 120, where appropriate and based on particular needs. If proxy 140 is implemented in a separate device from client device 130, the code of proxy 140 can operate in a secure environment to protect the private data provided in response to a request for the private data from server 120.

In an example implementation, proxy 140 could be a secure router or gateway in a protected enterprise network. Proxy 140 could be configured to intercept network flows en route between servers and multiple client devices within the protected enterprise network, Proxy 140 could be configured to connect to server 120, for example, via the Internet. In another example, proxy 140 could be implemented in a secure router of a home network. Proxy 140 could be configured to intercept network flows en route between client devices (e.g., client device 130) in the home network and servers (e.g., server 120) accessible via a network such as the Internet. In yet another implementation, proxy 140 could be implemented in a trusted cloud. A client device initiating a connection to server 120 could first connect to proxy 140 via the Internet. Thus, proxy 140 could protect private data of multiple client devices from various networks (e.g., enterprise networks, home networks, school networks, etc.) and stand-alone client devices (e.g., mobile devices using cellular technology, mobile devices using wireless technologies, etc.). The examples provided herein are merely illustrative of possible implementations of proxy 140 and are not intended to limit the broad teachings of this disclosure and potential applications and other implementations of embodiments disclosed herein.

In at least one example, proxy 140 includes software to achieve (or to foster) the private data protections, as outlined herein. Each of these elements can have an internal structure (e.g., a processor, a memory element, etc.) to facilitate some of the operations described herein. In other embodiments, these private data protections may be executed externally to these elements, or included in some other network element to achieve this intended functionality. Alternatively, proxy 140 may include this software (or reciprocating software) that can coordinate with other network elements in order to achieve the operations, as outlined herein. In still other embodiments, one or several devices may include any suitable algorithms, hardware, software, firmware, components, modules, interfaces, or objects that facilitate the operations thereof.

A server, such as server 120 in FIG. 1, is a network element that can provide services to client devices or other computing devices over one or more networks, such as network 110. Service 122 provided by server 120 may be configured to request private data, such as credentials needed to authenticate to the service. Service 122 can include, for example, access to various resources or accounts (e.g., financial, medical, retail, organization, business, etc.), file transfers, email, web content, etc. In at least some embodiments, server 120 can include, but is not limited to, a web server that delivers web content, a file transfer server that transfers files to a client device when requested, an email server for transferring electronic mail messages from a client device to a destination, a news server for accessing newsgroups, a gaming server for providing interactive games, an applications server for providing access to applications and/or databases, or any combination thereof.

Proxy 140 is a secure proxy including one or more modules configured to protect data that has been designated as private. Data store can be configured as a repository for private data associated with one or more network agents. As used herein, the term 'network agent' is intended to include users, client applications, and client devices. Data is designated as private when it is stored in data store 145. In at least some embodiments, private data can be 'associated' with at least one service (and its corresponding server), in addition to at least one network agent. A private data item (or set of private data items) in data store 145 can be mapped to one or more identifiers of a particular service to indicate its association to the service. These identifiers could include, but are not limited to, a domain name of a server, a uniform resource locator (URL) of the service e.g., URL of HTML web page), network address of the server, etc. A private data item (or set of private data items may also be mapped to identifiers of one or more network agents to indicate its association to the one or more network agents. These identifiers could include, but are not limited to, a client device identifier such as Media Access Control (MAC) address, a user identifier such as a Security Identifier (SID), a client application identifier such as a filename, etc. An example of a set of private data items could be a username and password for accessing a particular service by a particular user on one or more particular client devices. Multiple sets of private data items may be associated with the same network agent (or agents) where each set of private data items is associated with a different service. Individual private data items may also be associated with any suitable descriptor or tag indicating what type of private data the item represents (e.g., username, password, passphrase, account number, personal identification number (PIN), security question answers, etc.).

In at least some embodiments, identifiers of services and/or network agents can be mapped to private data items (or sets of private data items) using any suitable mapping, marking, or linking technique (e.g., lists, tables, associative arrays, pointers, indexes, graphs, linked lists, file names, relational databases, hash table, etc.), or any other technique or mechanism that represents a relation, connection, or link between the private data items and identifiers. For example, a simple table configuration, which is generally a data structure used to organize electronic information, is one possible way to implement data store 145, as previously described. It will be appreciated, however, that data store 145 could be modeled in various other ways, and these other configurations could be based on the particular preferences and needs of a given implementation. A private data item may also be mapped to a tag or descriptor indicating its type.

In at least some embodiments, when a proxy is configured to handle private data for one or more network agents associated with the same private data (e.g., a single user using one or more client devices, a single client device with a single client application, etc.), the private data items may not necessarily be mapped to any identifiers of the associated network agents (although they could be). If the proxy is configured to handle private data for multiple network agents associated with different private data, however, the private data items (or sets of private data items) associated with a particular network agent may be mapped to an identifier of that network agent. In addition, in some instances, multiple network agents may be associated with a private data item (or set of private data items). For example, a private data item provided to a service by a user (i.e., either manually or automatically) via a client device is associated with the user and the client device. If the user supplies the private data item to the service via multiple client devices, then the private data item can be associated to the user and all of the client devices used by the user. In this instance, the private data item in data store 145 can be mapped to an identifier of each of the one or more client devices used by the user, or an identifier of the user, or any combination thereof. In another example, if a private data item is provided to a service by a client application via a client device, then the private data item is associated with the client application and the client device. In this instance, the private data item in data store 145 could be mapped to an identifier of the client application, or an identifier of the client device, or a combination thereof. In yet another example, if a private data item is provided to a service by a client device that is an embedded controller, then the private data item is associated with the embedded controller and may be mapped to an identifier of the embedded controller.

By way of illustration, when a particular entity, such as a financial institution, requires a registered username and password to be provided before allowing access to an account through the institution's web server, then the username and password for an account owned by User-1 can be associated with the financial institution in data store 145 of proxy 140. In at least one embodiment, the username and password could be mapped to a domain name of the financial institution or a uniform resource locator (URL) of a web page of the financial institution that requests the username and password. If the proxy includes private data for multiple users, then the username and password can also be mapped to an identifier of User-1, or an identifier of the one or more client devices used by User-1, or a combination thereof.

In some embodiments, certain private data may not necessarily be directly associated with a particular service and corresponding server. For example, private data that is more general in nature and requested by numerous services, may simply be stored in data store 145 with a suitable descriptor or tag indicating what type of private data the item represents. For example, home address, telephone number, gender, marital status, etc., may be stored in data store 145 with any appropriate descriptor, tag, etc. When service 122 sends a request to client device 130 for this general private data, proxy 140 can be configured to interpret the particular type of private data being requested. Proxy 140 can also search data store 145 for private data associated with the client device and/or another network agent (e.g., user, client application) corresponding to the request from the server. Proxy 140 can also identify which private data items in data store 140 are associated with the descriptor or tag representing the particular type of data requested by server 120.

In at least one embodiment, data store 145 is a secure vault of private data that is integrated and secured within proxy 140. In other embodiments, data store 145 may be secured in a separate storage device, which is accessible by proxy 140. Any suitable technique may be configured to populate data store 145. In one example, any one or more communication channels (e.g., written mail, encrypted file transfer, verbal communication, etc.) can be exploited to provide a list of private data items and their associated services to an authorized person or entity (e.g., a service provider, a network administrator, etc.). The data store 145 can then be populated with the private data items. For example, in an enterprise network environment, users could provide private data items and identifiers of associated services to a network administrator for entry into data store 145. Each user could also provide a list of all client devices used by that user within the enterprise network environment. Identifiers of the client devices could be entered in data store 145 and mapped to the private data items of the user. In at least one embodiment, protected data storage module 143 could be configured to facilitate storage of private data items into data store 145 (e.g., via a user interface for manual entry of private data items, via software to read particular types of files and store data items from the file, etc.). In other examples, certain private data items may be populated in data store 145 by a manufacturer. For example, a manufacturer of an embedded controller may populate a data store with a password and a user/device identifier to enable the embedded controller to authenticate to the manufacturer's service.

In some embodiments, an incremental approach to populating and/or updating data store 145 may be used. Proxy 140 could be configured to automatically detect that private data requested by a server is not available. In this scenario, proxy 140 could send a request to client device 130 to create an entry for the requested private data. Any network agent (i.e., user, client application, or client device) corresponding to the request for the private data from the server could create the requested private data. In one example, proxy 140 could be configured to allow a user to indicate to proxy 140 which web elements the user considers private. For example, the user could have out-of-hand communication with proxy 140 to indicate which data items should be treated as private. In another example, an unmodified request for information, such as an unmodified HTML web page could be provided to client device 130 and the user could provide input for requested data items. Proxy 140 could be configured to recognize and handle these new elements in subsequent network flows. In at least some embodiments, proxy 140 may also populate data store 145 with this new private data indicated by the user.

Proxy 140 can also be configured to learn a client device to user association. This association may be learned at configuration time and stored as a series of MAC addresses, which group all client devices used by the same user. The association may also be learned automatically. For example, if there is no password for a specific service, then the user may get an unaltered object with a request for a password. The user may supply one. If the same password is entered from multiple client devices, then they can be automatically associated with the same user in the future.

When data store 145 is initially populated, an unlocking mechanism may be initiated to enable a network agent to authorize proxy 140 to use relevant private data from data store 145. In at least one embodiment, a one-time-password (OTP) technique may be used, in which a sequence of non-repeating passwords are used to authorize the use of private data. The one-time passwords may be pre-generated by an algorithm (or randomly generated), and shared with the network agent using any appropriate communication channel (e.g., out-of-band channel such as short message service (SMS) message, security tokens, software that runs on a separate device such as a mobile phone, etc.). In another embodiment, one or more secure communication channels to proxy 140 could be employed to provide authentication (e.g., multi-factor authentication, human presence, etc.). Biometric data (e.g., fingerprints, eye retinas and irises, voice recognition, etc.) may also be used to unlock the private data in some embodiments. In some embodiments, automatic unlocking of private data can be allowed under certain scenarios (e.g., user presence verified, a history of previous authorizations, a history of the user requesting proxy 140 not to ask for authorization for a particular HTML form, etc.). For network flows using HTTPS protocol, proxy 140 could also operate as a secure socket layer (SSL) man-in-the-middle (MitM) to handle HTTPS network flows without generating security warnings. In at least one embodiment, data store 145 could be populated via encrypted communication (e.g., encrypted with a public key of proxy 140), and only decryptable inside proxy 140 with a corresponding private key. These approaches are intended to be illustrative and not limiting as any number of other unlocking mechanisms may be implemented in embodiments of a system to protect private data disclosed herein. Moreover, one or more of these unlocking mechanisms may also work with any protocols including, but not limited to, HTTP, SPDY, FTP, SMTP, Post Office Protocol (POP), Internet Message Access Protocol (IMAP), etc.

In at least one embodiment, the unlocking mechanism may be performed via a separate security protocol or communication link. The authorization request may be provided to a client device using a different media, channel, or protocol. For example, a proxy can ask a trusted execution environment (TEE) inside a client device via UDP protocol to verify the biometrics of a human user operating the client. The TEE may do it invisibly to the user (e.g., face recognition), thus providing the authorization and allowing unlocking of the private data in a user-friendly manner. In another example, a proxy can ask for a fingerprint scan out of the context of a web page requesting credentials to login. The proxy's modification of the server transmission may then include removing the login-request page completely, where biometrics allows the proxy to do the login transparently to the user.

In operational terms, proxy 140 can be configured with modification module 141 to modify, on the fly, an object containing a request for private data sent to client device 130 from server 120. Modification module 141 can be implemented on any level of the network communication. For example, it can operate on application layer transmissions or it can operate on the transport (e.g., TCP/IP packets) level. Any other suitable modification method may also be employed. The requested private data could include one or more private data items (e.g., username, password, account number, passphrase, home address, personal data, religious affiliation, certain photographs, etc.) associated with a user of client device 130 or other network agent corresponding to the network flow from the server. Modification module 141 can be configured to determine which service is associated with the request, and what type of private data items are requested in the object. Modification module 141 can also determine whether data store 145 includes private data items associated with client device 130 (and/or another network agent corresponding to the network flow from the server) that have the same type as the requested private data items and that are associated with that particular service (e.g., service 122). All of the private data items stored in data store 145 can potentially be associated with a single user, single client application, or single embedded controller. In these scenarios, modification module 141 may not need to determine associations between network agent(s) and the stored private data items.

When the private data items requested by a server are found in data store 145, modification module 141 can create a modified object with a request for authorization to unlock the requested private data. A modified object can be created by modifying a copy of the original object, by generating a new object, or by modifying the original object. In some scenarios, a copy of the original object may need to be saved for later use in providing the requested private data to the requesting server. Instead of the original object with the private data request, the modified object with the authorization request can be provided to the destination client device. In at least one embodiment, the authorization request can be displayed on a screen of the client device and can provide a prompt for a user to enter the required authorization. The user can provide appropriate authorization (e.g., entry of a pre-shared one-time password, biometric data, multi-factor authentication, etc.) to authorize proxy 140 to unlock the user's private data associated with the requesting service.

Proxy 140 can include response module 142 to handle communications from a client device responsive to authorization requests. Response module 142 can be configured to receive a response from client device 130, and to verify any authorization information contained in the response. If verification of the authorization information indicates the authorization information is valid, then proxy 140 can obtain the relevant private data items from data store 145. Response module 142 can provide the private data items to the requesting service (e.g., service 122 of server 120).

In an example scenario, assume an object sent by service 122 to client device 130 is an HTML web page requesting a username and password. Proxy 140 recognizes that the HTML web page includes fields configured to accept user input for a username and password. Proxy 140 can search data store 145 to determine whether a username and password are associated with the destination client device (and/or the user) and also associated with service 120. If a username and password are found, then proxy 140 can create a modified HTML web page with a request for authorization. The request for authorization includes an authorization mechanism for unlocking the username and password. Proxy 140 can send the modified HTML web page to client device 130 and can receive a response from client device 130. If authorization information in the response is valid, then proxy 140 can obtain the relevant username and password data items from data store 145. Proxy can also fill in the username and password fields of the original HTML web page with the username and password data items obtained from data store 145. A response (e.g., HTML POST request) can then be sent to server 120 based on the completed HTML web page.

Figure 2:
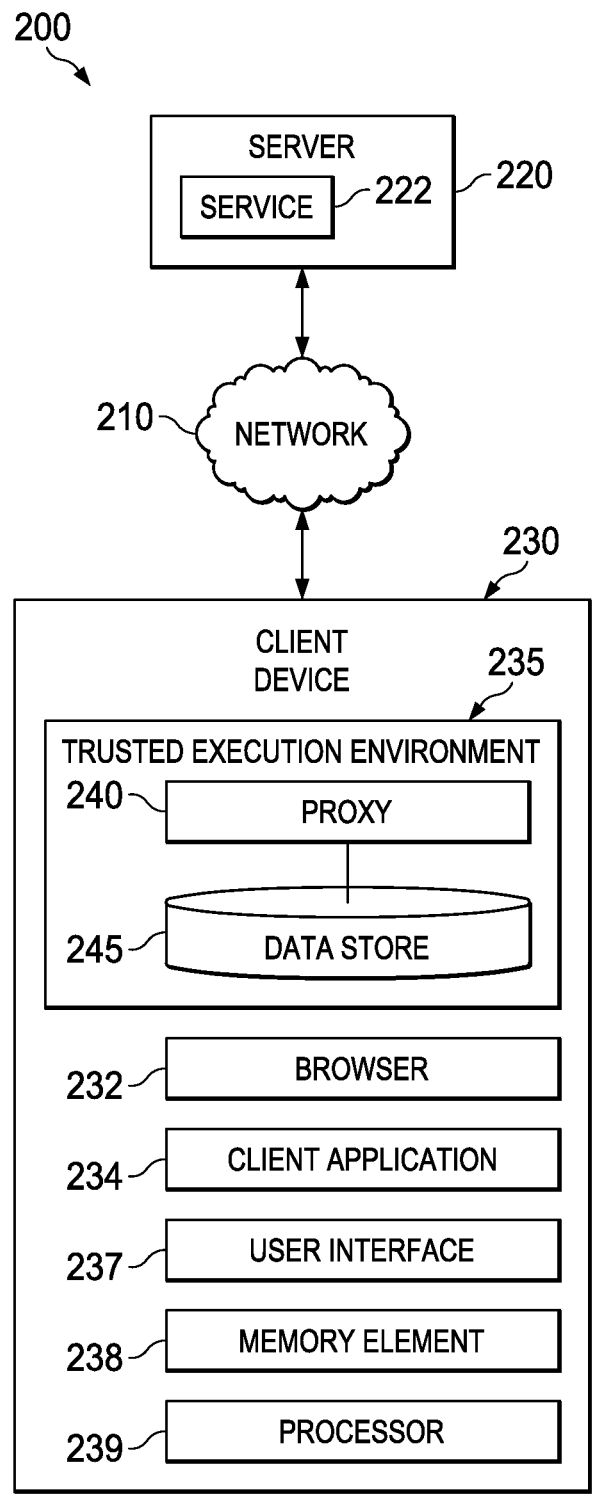
FIG. 2 is a simplified block diagram of another example network environment in which private data is protected in accordance with another embodiment of the disclosure.

FIG. 2 illustrates an alternative embodiment providing a network environment 200 in which a system is configured for protecting private data. Network environment 200 can include a network 210 and a server 220 with a service 222, which are similar to network 110 and server 120 with service 122, previously shown and described with reference to FIG. 1. Network environment 200 also includes a client device 230, which can have some similar components to client device 130 of FIG. 1. For example, client device 230 can include a browser 232, a user interface 237, a memory element 238, and a processor 239. In some embodiments, client device 230 may also include a client application 234 that is configured to automatically authenticate to a server, such as server 220. Unlike client device 130, however, client device 230 is configured with a proxy 240 and a data store 245 in a trusted execution environment 235 of client device 230. For at least some configurations of a trusted execution environment, proxy 240 may be implemented in the client device (e.g., a mobile phone) via software signed by the manufacturer of the device, to ensure the code of proxy 240 is not compromised by malicious software. Proxy 240 can be configured to only run inside trusted execution environment 235.

In at least one embodiment, proxy 240 can be configured with modules similar to those described with reference to FIG. 1 (e.g., modification module 141, response module 142, protected data storage module 143). In particular, proxy 240 can act as an intermediary between client device 230 and server 220, in substantially the same way that proxy 140 acts as an intermediary between client device 130 and server 120. Modules of proxy 240 can include code to intercept a network flow en route from server 220 to client device 230 with an object that requests private data, create a modified object to request authorization to access the relevant private data, and upon receiving valid authorization information, provide the requested private data to server 220.

Trusted execution environment 235 protects proxy 240 and data store 245 from malicious attacks by malware), by allowing the code of proxy 240 to operate in a secure environment within client device 230. In at least some embodiments of trusted execution environment 235, only trusted code is executed. Trusted execution environment 235 can effectively isolate proxy 240 and data store 245 from other software of client device 230. Thus, the private data in data store 245 can remain protected and secure. Examples of trusted execution environments include, but are not limited to, Intel® vPro™ technology offered by Intel® Corporation of Santa Clara, Calif., Intel® Software Guard Extensions™ offered by Intel Corporation, secure elements or trust zones on a mobile device, secure enclaves, smart cards operating Java environment, etc. A secure proxy, such as proxy 240 in trusted execution environment 235, ensures that private data is transmitted only by the secure proxy. As a result, when the secure proxy controls network communications, private data communicated by proxy 240 to server 220 is not accessible to malware, including malware operating at the kernel level, at the hypervisor level, or even from the firmware or hardware (e.g., rootkits and bootkits).

Embodiments disclosed herein offer protection of private data with several advantages. First, proxies 140, 240 can be implemented for use with a client device without modifications to any browsers of the client device, which can often be costly. Changes to software that is used by other communication protocols may also be avoided. Additionally, the implementations of proxies 140, 240 also do not require changes on the server-side (e.g., 120 or 220) and the operations of the proxy (e.g., 140 or 240) are completely transparent to the server. A simple change in user behavior (or client application or embedded controller behavior) is needed to provide appropriate authorization when private data has been requested. In at least one embodiment, a modified HTML web page that is provided to the client device can be displayed on the client device. The authorization request included in the modified HTML web page can provide instructions to the user regarding what is required to authorize access to the user's private data (e.g., instead of "Login:" and "Password:" request the user may see "Provide OTP number to unlock your login and password:"). In addition, the authorization request may also provide instructions to the user regarding the procedure to populate the data store if there are no private data items associated with the service that sent the original request for private data received b the proxy.

Another advantage includes the flexibility of protecting any type of private data, in addition to authentication credentials. Designating the data as private simply involves populating the data store with the private data, creating appropriate associations with the stored private data (e.g., service provided by a server, client device, user, client application, embedded controller) and associating the stored private data with an appropriate tag or descriptor indicating its type. If needed, the proxy can easily be configured to recognize requests for that type of private data in network communications from the server.

Another benefit of at least some embodiments disclosed herein, is that periodic server requests for password changes may be handled internally within a proxy and transparently to the user. The proxy can identify a request from a server to change one or more credentials (e.g., expired password) corresponding to one or more private data items associated with a particular service provided by the server. The proxy may initiate a change of the expired password, handle this transaction with no user involvement, and reflect new credentials in data store 145. In this scenario a user will not even have to know the password, which provides additional security against attacks based on bribing, extortion or torture.

Implementation of the system also provides advantages in an enterprise environment or other multi-user environment. A secure proxy (e.g., proxy 140) can be implemented in a perimeter device, which reduces the risks of endpoints (e.g., client device 130) losing private data. Implementation of the system in an enterprise can be extremely cost effective, can accommodate existing browsers on multiple endpoints, and can accommodate bring-your-own-device (BYOD) scenarios. To initiate the system, a secure storage vault (e.g., data store 145) is separately populated in a secure way. The data items used to populate the secure storage vault can be provided by each user for all of the client device devices he or she uses. Once the secure storage vault is populated, the system can begin providing protection of the private data when the identified client device devices are used. In the enterprise environment, embodiments disclosed herein can allow centralized and transparent management of access to external services (e.g., 122 or 122). Credentials may be invisibly supplied so that all employees enjoy immediate access. Required credentials may be created and managed by the administrators completely transparently to the users. Any external means of client device/user identification/authentication can be employed to unlock access (e.g. entrance logs, domain login, assigning an IP address via Dynamic Host Configuration Protocol (DHCP), biometrics, multi-factor authentication, etc.).

Regarding the internal structure associated with client devices 130, 230, proxy 140, and servers 120, 220, these devices can include volatile and/or nonvolatile memory elements (e.g., memory elements 138, 148, 238) for storing data and information, including instructions, logic, and/or code, to be used in the operations outlined herein. Client devices 130, 230, proxy 140, and servers 120, 220 may keep data and information in any suitable memory element (e.g., random access memory (RAM), read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, an application specific integrated circuit (ASIC), or other types of nonvolatile machine-readable media that are capable of storing data and information), software, hardware, firmware, or in any other suitable component, device, element, or object where appropriate and based on particular needs. Any of the memory items discussed herein (e.g., memory elements 138, 148, 238) should be construed as being encompassed within the broad term 'memory element.' Moreover, the information being used, stored, tracked, sent, or received in client devices 130, 230, proxy 140, and servers 120, 220 could be provided in any storage structure including, but not limited to, a repository, database, register, queue, table, or cache, all of which could be referenced at any suitable timeframe. Any such storage structures (e.g., data stores 145, 245) may also be included within the broad term 'memory element' as used herein.

In an example implementation, proxies 140, 240, may include software modules (e.g., modification module 141, response module 142, protected data storage module 143) to achieve, or to foster, operations as outlined herein. These modules may be suitably combined or partitioned in any appropriate manner, which may be based on particular configuration and/or provisioning needs. In some embodiments, one or more of such operations may be carried out by hardware and/or firmware, implemented externally to these elements, or included in some other computing device to achieve the intended functionality. These elements may also include software (or reciprocating software) that can coordinate with other computing devices in order to achieve the operations, as outlined herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by one or more processors, or other similar machines, etc.), which may be inclusive of non-transitory machine readable storage media. Client devices 130, 230, proxy 140, and servers 120, 220 may include one or more processors (e.g., processors 139, 149, 239) that can execute logic or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an AMC that includes logic, software, code, electronic instructions, or any suitable combination thereof. Any of the potential processing elements, modules, and machines described herein should be construed as being encompassed within the broad term 'processor.'

Figure 3:
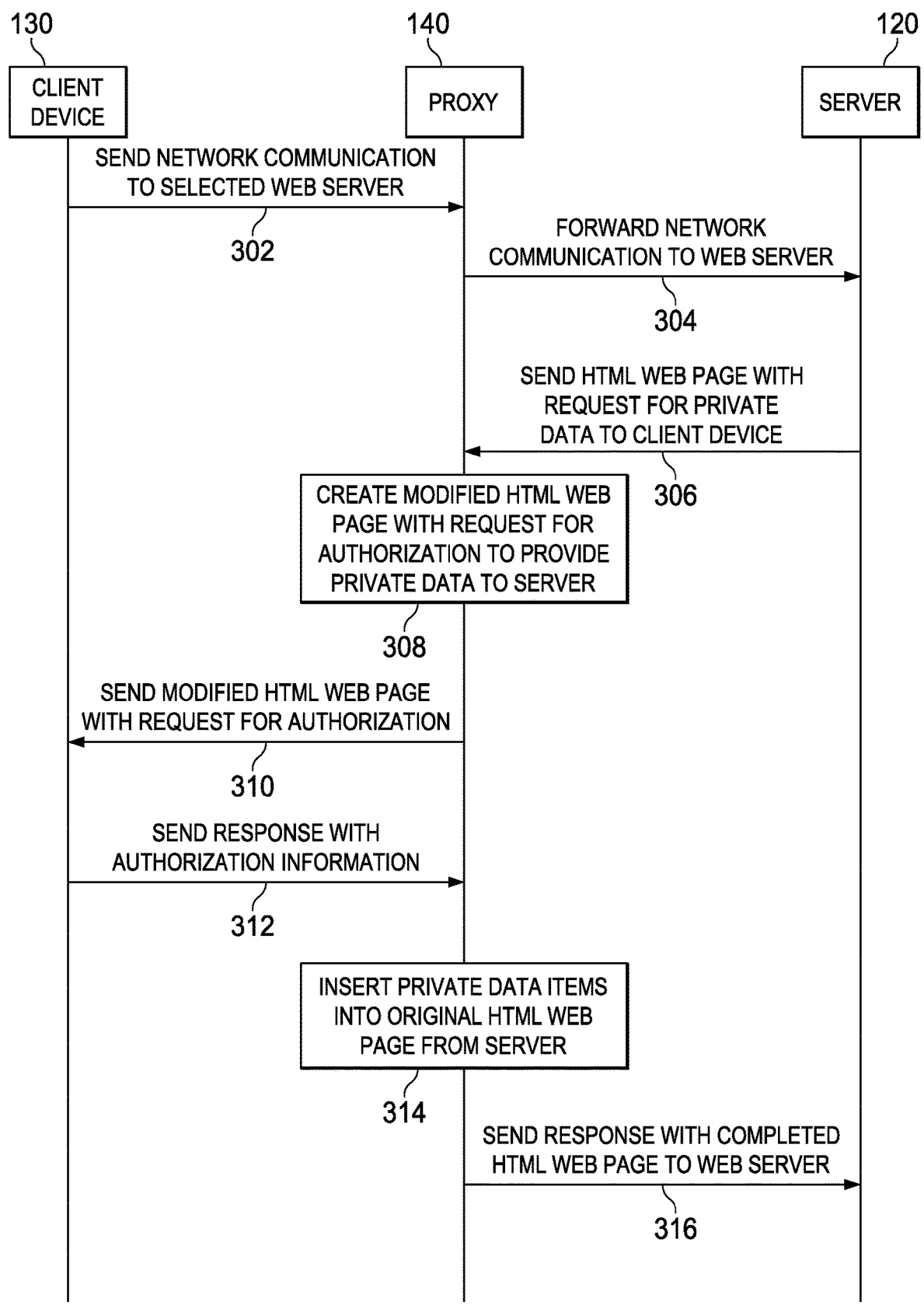
FIG. 3 is an interaction diagram illustrating possible interactions associated with at least one of the embodiments of the network environment according to the disclosure.

Turning to FIG. 3, a simplified interaction diagram illustrates possible interactions that may occur in network environment 100 between client device 130, proxy 140, and server 120, according to at least one embodiment. In at least one embodiment, modification module 141 and response module 142 of proxy 140 could perform one or more interactions and activities associated with proxy 140. Browser 132 could perform one or more interactions and activities associated with client device 130. Service 122 could provide objects with requests for private data. Generally, the interactions and activities shown and described with reference to FIG. 3 are also applicable to interactions and activities of network environment 200 of FIG. 2, which illustrates an embodiment in which proxy 240 is integrated in trusted execution environment 235 of client device 230. The example of FIG. 3 is merely an example of potential interactions, and does not limit the scope of the claims. For example, number of modules may vary, number of components may vary, specific interactions may vary, order of interactions may vary, etc.

FIG. 3 illustrates an example scenario in which a user is using browser 132 of client device 130 to browse the Internet. In this example scenario, server 120 is a web server and the network communications involve HTML web pages. In addition, it is presumed that data store 145 has already been populated with private data of the user of client device 130.

Initially, through browser 132 of client device 130, the user may select a particular web server via a particular domain name, network address, URL) to access. At 302, client device 130 sends a network communication, such as a Hypertext Transfer Protocol (HTTP) request message, to the selected web server. Proxy 140 intercepts the network communication. Because the communication is not a response to a request for authorization to unlock private data, proxy 140 forwards it at 304, to the destination web server, server 120.

In this example scenario, server 120 only allows access to its services (e.g., service 122) by users who have created accounts on the website. At 306, server 120 responds to client device 130 by sending an HTML: web page that includes a request for private data items of the user, such as a username and password for an account registered with the service. If the HTML web page is displayed by a browser, it may include, for example, two empty boxes preceded by "Username:" and "Password:", which can be recognized by a user as instructions to enter his or her username and password for the particular service. The HTML web page itself may also include an identifier of the service associated with the HTML web page, which could be a domain name of a financial institution, for example.

Proxy 140 intercepts a network flow with the HTML web page from server 120. Proxy 140 can evaluate the HTML web page and determine what private data items are being requested. Proxy 140 can then search data store 145 to determine whether client device 130 (and/or the user) is associated with a username and password that are also associated with the service of server 120 (e.g., by domain name, URL of web page). If a username and password are found, then at 308, proxy 140 can create a modified HTML web page with a request for authorization to access the private data items requested by server 120. At 310, proxy 140 can send the modified HTML: web page containing the request for authorization to client device 130.

Browser 132 of client device 130 can display the modified HTML web page received from proxy 140. The web page may provide instructions for the user to authorize proxy 140 to access the private data items requested by server 120 and to provide them to server 120. In one embodiment, the user may be instructed to provide a one-time password that the user receives in an out-of-band communication. At 312, client device 130 can send a response with authorization information provided by the user. Proxy 140 intercepts the response and determines whether the authorization information is valid. If the authorization information is determined to be valid, then proxy 140 can obtain the requested private data items from data store 145. At 314, proxy 140 can insert the private data items directly into the original HTML web page from server 120. At 316, proxy 140 can upload the completed HTML web page to server 120. Thus, the operations of proxy 140 to protect the private data requested by server 120, are transparent to server 120.

Figure 4:
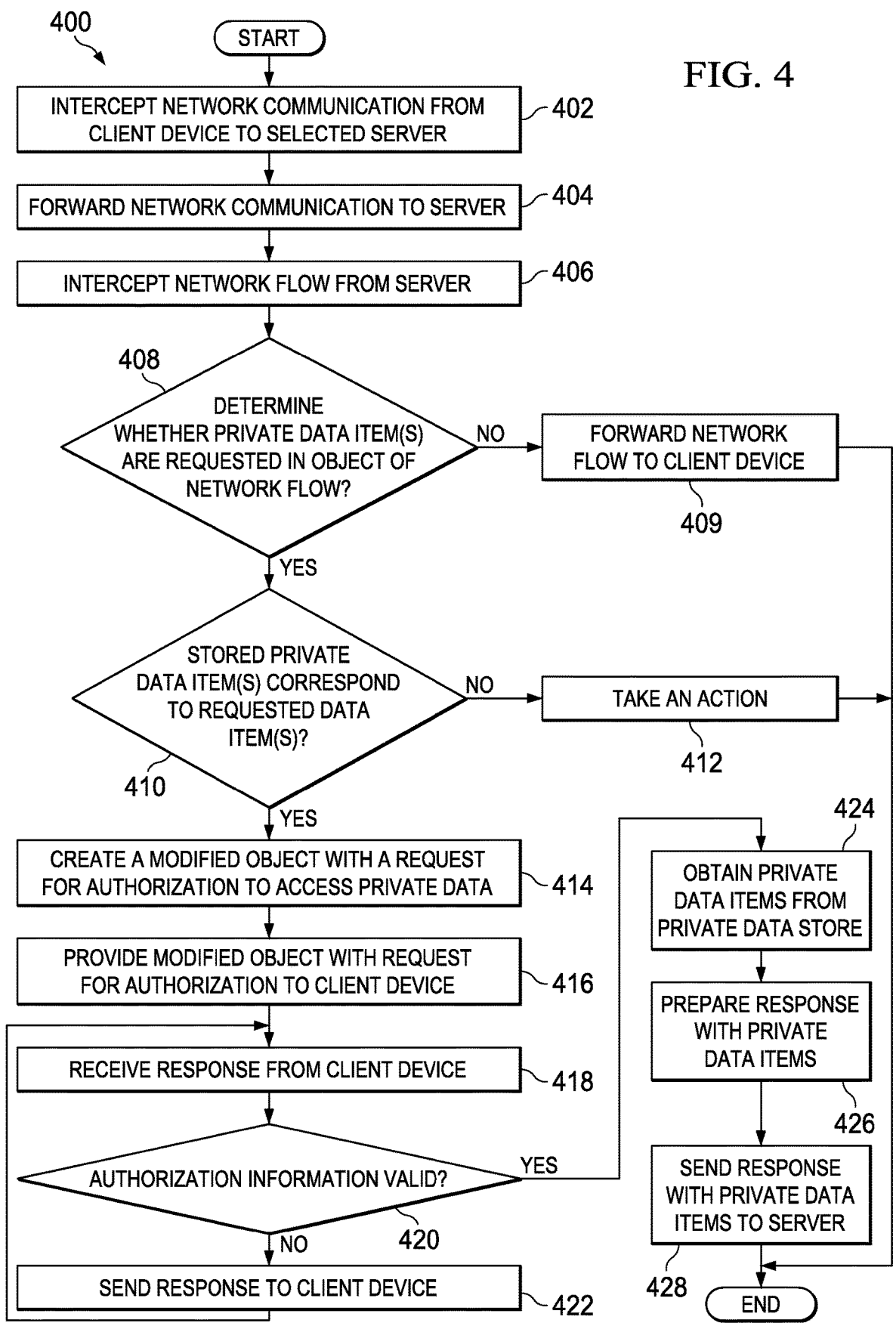
FIG. 4 is a simplified flowchart illustrating potential activities associated with at least one of the embodiments of the network environment according to the disclosure.

FIG. 4 is a flowchart of a possible flow 400 of operations that may be associated with embodiments described herein. In at least one embodiment, one or more sets of operations correspond to activities of FIG. 4. Proxies 140, 240, or a portion thereof, may utilize the one or more sets of operations. Proxies 140, 240 may comprise means such as processors 149, 239, for performing the operations. In an embodiment, at least some operations of flow 400 may be performed by a modification module (e.g., 141) and at least some other operations of flow 400 may be performed by a response module (e.g., 142). Flow 400 of FIG. 4 may occur in network environments 100, 200 when data stores 145, 245 have been populated with private data associated with one or more services and network agents (i.e., users, client devices, client applications, embedded controllers).

Flow 400 may begin at 402, where a proxy receives a network communication (e.g., HTTP request, FTP request, etc.) from a client device. The network communication may be addressed to a particular server on the Internet, for example, and the proxy can intercept the communication. At 404, the proxy can forward the network communication to the appropriate destination server (e.g., web server, FTP server, etc.). At 406, the proxy can intercept the server's network flow to the client device. The server's network flow may be a response to the network communication sent by the client device and forwarded by the proxy.

At 408, the proxy can determine whether one or more private data items are requested in an object of the network flow from the server. This determination can be made by evaluating the actual content of the object (e.g., searching an HTML web page for indications of a private data request such as blank boxes preceded by private data descriptions such as "Username", "Password", "Account Number", etc.). If the response does not contain a private data request, then at 409, the proxy can forward the network flow with the unmodified object to the client device and flow 400 ends.

If it is determined at 408, that the object does contain a request for one or more private data items, then at 410, the proxy can determine whether corresponding private data items are stored in the data store. The proxy may determine a type of private data being requested (e.g., username, password, etc.) and an identifier of a service associated with the object (e.g., domain name, URL of service, etc.), If the proxy handles private data for multiple users, then the proxy may also determine an identifier for the destination client device associated with the network flow from the server. In some embodiments, the proxy may determine an identifier of a user or client application associated with the network flow. Accordingly, the proxy can search the data store and identify corresponding private data items based, at least in part, on an association with the service, the type of private data, and possibly the client device. In some embodiments, the proxy may also identify corresponding private data items based on an association with a particular user or client application.

If no corresponding private data items are found, then at 412, the proxy may take an appropriate action. The proxy may provide instructions to the user regarding the procedure to populate the data store with the missing private data items. In one possible embodiment, when the object is an HTML web page requested by a user of the client device, the proxy can send an HTML document to be displayed by the browser of the client device, with instructions to guide the user to populate the data store with the missing private data items. In another embodiment, the proxy may send an appropriate error message to the client device. In another embodiment, the proxy may simply forward the response to the client device, without any modification to the object, including the request for private data items. Flow 400 may end after the proxy takes an action as indicated at 412.

At 410, if corresponding private data items are found in the data store, then at 414, the proxy can create a modified object with a request for authorization to access the requested private data items and provide the items to the server. The request for authorization can be configured with any number of unlocking mechanisms e.g., one-time passwords, biometric authorization, multi-factor authentication, etc.). The particular unlocking mechanism to be used for the private data item may be determined by the proxy and may be based on a particular network agent associated with the private data item. At 416, the modified object can be provided to the client device. In an implementation as shown in FIG. 1, the modified object can be transmitted to the client device in a network flow. In an implementation as shown in FIG. 2, the modified object can be provided to the client device via a browser, via a client application) from the trusted execution environment.

At 418, the proxy can receive a response from the client device that includes authorization information (e.g., one-time password, biometric data, etc.). Depending on the particular implementation, this authorization information could be provided by a user (e.g., via a screen of the client device), or by a client device or client application (e.g., a client device or client application automatically authenticating to the particular service). At 420, the proxy attempts to verify the authorization information (e.g., determine whether one-time password is valid, determine whether biometric data matches the expected biometric data, etc.). Verifying the authorization information includes determining whether the authorization information is valid. If the authorization information is determined to not be valid at 420, then at 422, the proxy can send an error message to the client device, and flow can return to 418 once new authorization information is received. If invalid authorization information is received a predetermined number of times (e.g., 1 or more), then the proxy may invoke additional mechanisms to ensure that an authorized user (or client device or client application) is attempting to authorize access to relevant private data.

If the authorization information is determined to be valid at 420, then at 424, the proxy can obtain the one or more private data items from the data store that correspond to the one or more requested private data items in the original object received from the server. At 426, the proxy can prepare a response to the server with the one or more private data items. For example, if the private data request was sent via an HTML web page, then the proxy can insert the private data items directly into the HTML web page at appropriate locations (e.g., data entry boxes). At 428, the response containing the private data items can be sent to the server as an HTTP POST form), and flow 400 ends.

Figure 5:
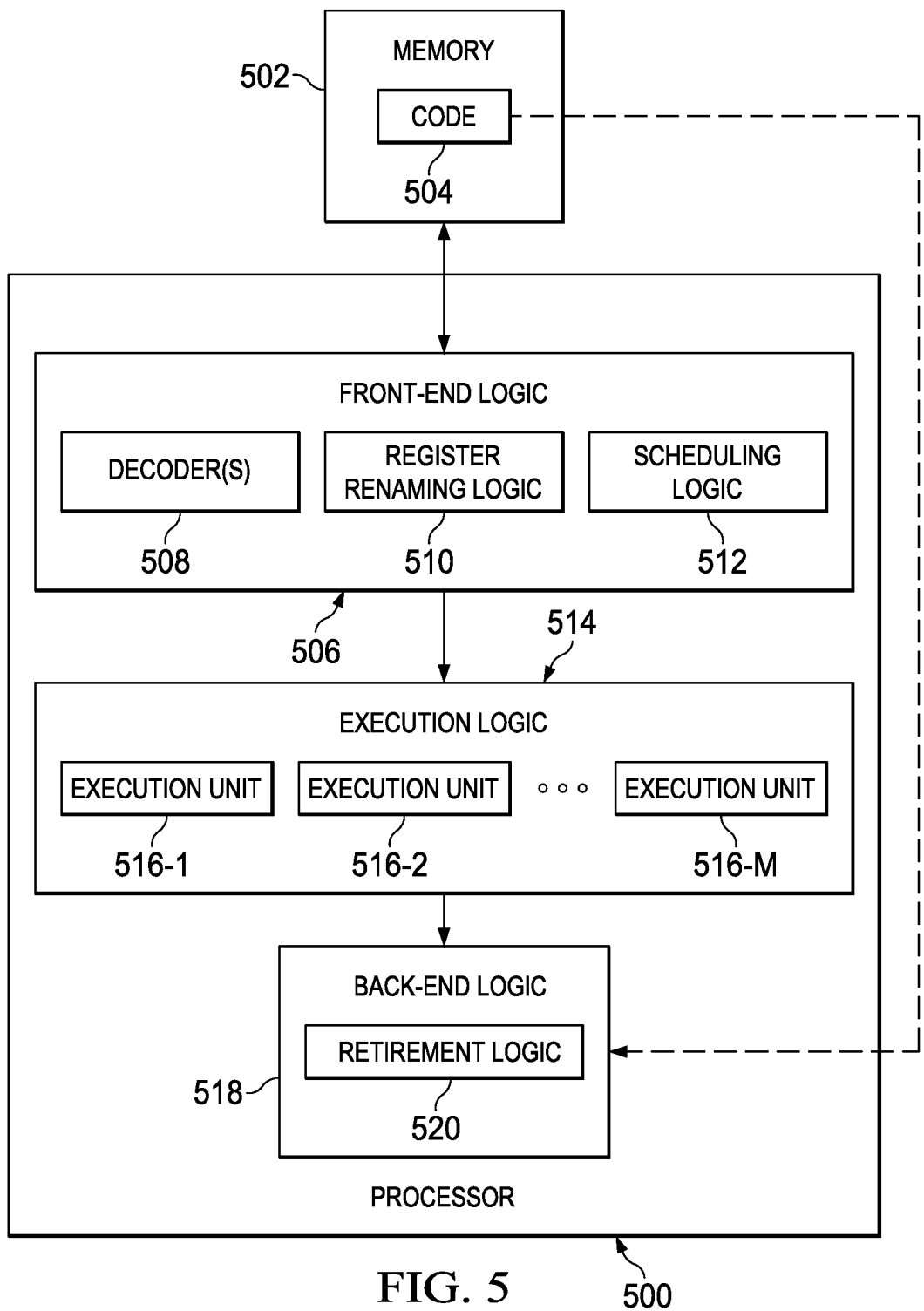
FIG. 5 is a block diagram of a memory coupled to an example processor according to an embodiment.

FIG. 5 is an example illustration of a processor according to an embodiment. Processor 500 is one possible embodiment of one or more of processors 139 and 239 of client devices 130 and 230, respectively and of processor 149 of proxy 140. Processor 500 may be any type of processor, such as a microprocessor, an embedded processor, a digital signal processor (DSP), a network processor, a multi-core processor, a single core processor, or other device to execute code. Although only one processor 500 is illustrated in FIG. 5, a processing element may alternatively include more than one of processor 500 illustrated in FIG. 5. Processor 500 may be a single-threaded core or, for at least one embodiment, the processor 500 may be multi-threaded in that it may include more than one hardware thread context (or "logical processor") per core.

FIG. 5 also illustrates a memory 502 coupled to processor 500 in accordance with an embodiment. Memory 502 is one embodiment of memory element 114 of client device platform 100. Memory 502 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Code 504, which may be one or more instructions to be executed by processor 500, may be stored in memory 502. Code 504 can include instructions of various modules (e.g., modification module 141, response module, protected data storage module 143, etc.) that may be stored in software, hardware, firmware, or any suitable combination thereof, or in any other internal or external component, device, element, or object where appropriate and based on particular needs. In one example, processor 500 can follow a program sequence of instructions indicated by code 504. Each instruction enters a front-end logic 506 and is processed by one or more decoders 508. The decoder may generate, as its output, a micro operation such as a fixed width micro operation in a predefined format, or may generate other instructions, microinstructions, or control signals that reflect the original code instruction. Front-end logic 506 also includes register renaming logic 510 and scheduling logic 512, which generally allocate resources and queue the operation corresponding to the instruction for execution.

Processor 500 can also include execution logic 514 having a set of execution units 516-1 through 516-M. Some embodiments may include a number of execution units dedicated to specific functions or sets of functions. Other embodiments may include only one execution unit or one execution unit that can perform a particular function. Execution logic 514 can perform the operations specified by code instructions.

After completion of execution of the operations specified by the code instructions, hack-end logic 518 can retire the instructions of code 504. In one embodiment, processor 500 allows out of order execution but requires in order retirement of instructions. Retirement logic 520 may take a variety of known forms (e.g., re-order buffers or the like). In this manner, processor 500 is transformed during execution of code 504, at least in terms of the output generated by the decoder, hardware registers and tables utilized by register renaming logic 510, and any registers (not shown) modified by execution logic 514.

Although not shown in FIG. 5, a processing element may include other elements on a chip with processor 500. For example, a processing element may include memory control logic along with processor 500. The processing element may include I/O control logic and/or may include I/O control logic integrated with memory control logic. The processing element may also include one or more caches. In some embodiments, non-volatile memory (such as flash memory or fuses) may also be included on the chip with processor 500. In an embodiment as shown and described with reference to FIG. 2, part of memory 502 may be encrypted and inaccessible to any code other than the proxy code 240 to provide a trusted execution environment 235 and protect data store 245. Only specially crafted code (e.g., digitally signed) may be configured to run inside environment 235.

Figure 6:
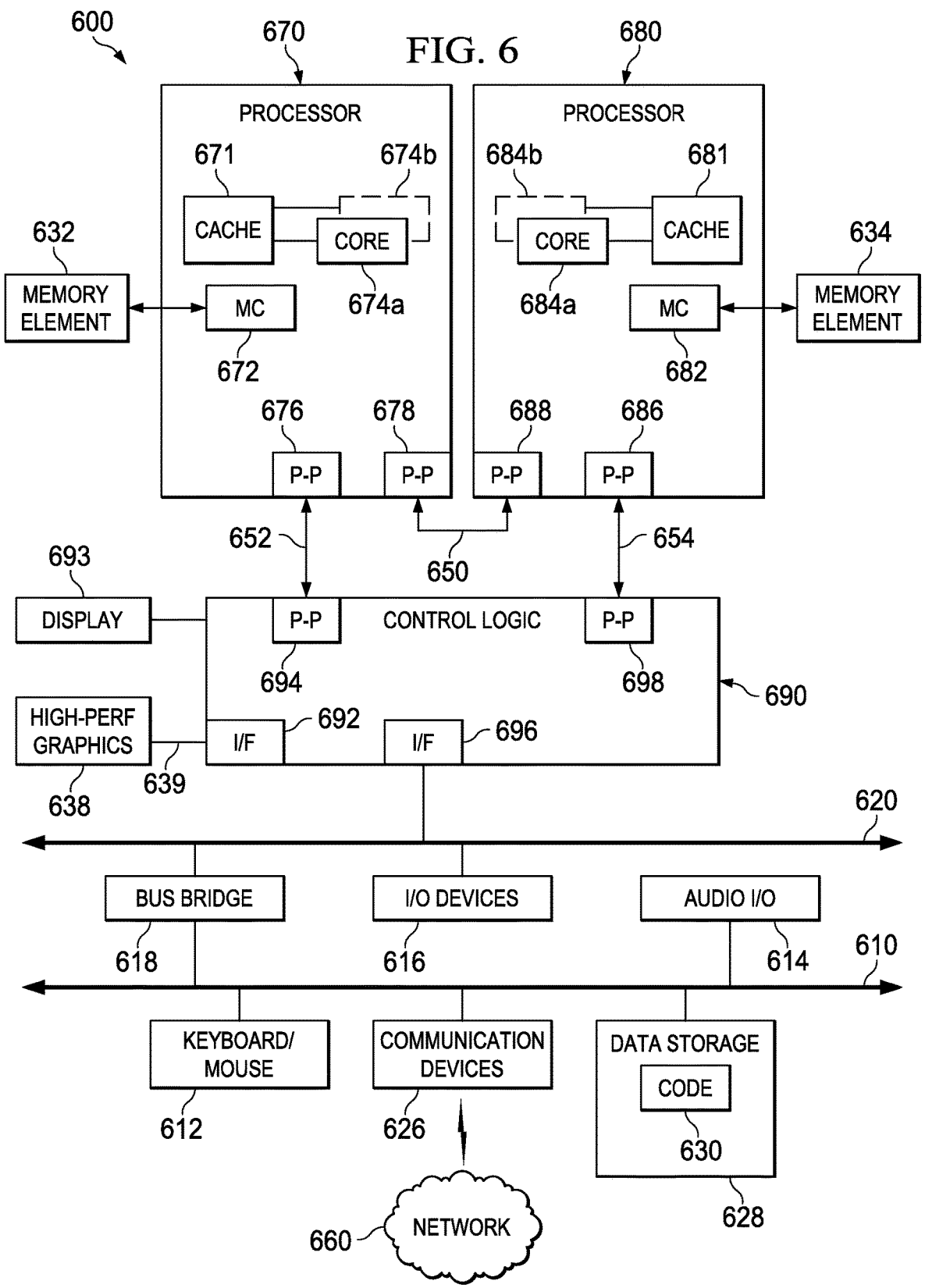
FIG. 6 is a block diagram of an example computing system that is arranged in a point-to-point (PtP) configuration according to an embodiment.

FIG. 6 illustrates a computing system 600 is one possible example of a computing device that is arranged in a point-to-point (PtP) configuration according to an embodiment. In particular, FIG. 6 shows a system where processors, memory, and input/output devices are interconnected by a number of point-to-point interfaces. In at least one embodiment, one or more of client devices 130, 230, proxy 140, and servers 120, 220, shown and described herein, may be configured in the same or similar manner as exemplary computing system 600.

Processors 670 and 680 may also each include integrated memory controller logic (MC) 672 and 682 to communicate with memory elements 632 and 634. In alternative embodiments, memory controller logic 672 and 682 may be discrete logic separate from processors 670 and 680. Memory elements 632 and/or 634 may store various data to be used by processors 670 and 680 in achieving operations associated with protection of private data, as outlined herein.

Processors 670 and 680 may be any type of processor, such as those discussed with reference to processor 500 of FIG. 5, processors 139, 149 of FIG. 1, and processor 239 of FIG. 2. Processors 670 and 680 may exchange data via a point-to-point (PtP) interface 650 using point-to-point interface circuits 678 and 688, respectively. Processors 670 and 680 may each exchange data with a control logic 690 via individual point-to-point interfaces 652 and 654 using point-to-point interface circuits 676, 686, 694, and 698. As shown herein, control logic is separated from processing elements 670 and 680. However, in an embodiment, control logic 690 is integrated on the same chip as processing elements 670 and 680. Also, control logic 690 may be partitioned differently with fewer or more integrated circuits. Additionally, control logic 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Control logic 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, joystick, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration capable of achieving the protection of private data, according to the various embodiments provided herein.

Note that with the examples provided herein, interaction may be described in terms of two, three, or more computing devices. However, this has been done for purposes of clarity and example only. In certain cases, it may be easier to describe one or more of the functionalities of a given set of flows by only referencing a limited number of computing devices. Moreover, the private data protection system is readily scalable and can be implemented across a large number of components, as well as more complicated/sophisticated arrangements and configurations. Accordingly, the examples provided should not limit the scope or inhibit the broad teachings of the private data protection system as potentially applied to a myriad of other architectures.

It is also important to note that the operations described with reference to FIGS. 1-6, illustrate only some of the possible private data protection activities that may be executed by, or within, network environments 100 and 200. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although network environments 100 and 200 have been illustrated with reference to particular elements and operations that facilitate the private data protection activities, these elements and operations may be replaced by any suitable architecture, protocols, and/or processes that achieve the intended functionality of the private data protection system.

OTHER NOTES AND EXAMPLE

The following examples pertain to embodiments in accordance with this Specification. Note that all optional features of the apparatuses and systems described above may also be implemented with respect to the method or process described herein and specifics in the examples may be used anywhere in one or more embodiments.

Example 1 is at least one machine readable storage medium having instructions stored thereon for protecting private data, where the instructions when executed by at least one processor cause the at least one processor to: intercept a network flow en route from a server to a client device; identify a request for a private data item in an object of the network flow; identify the private data item in a data store; provide, to the client device, a modified object including an authorization request; and send the private data item to the server when valid authorization information is received.

In Example 2, the subject matter of Example 1 can optionally include the instructions that when executed by the at least one processor further cause the at least one processor to receive authorization information from the client device, determine whether the authorization information is valid, and obtain the private data item if the authorization information is determined to be valid.

In Example 3, the subject of matter of any one of Examples 1-2 can optionally include the instructions that when executed by the at least one processor further cause the at least one processor to determine an unlocking mechanism for the private data item, and create the modified object including the authorization request based, at least in part, on the unlocking mechanism.

In Example 4, the subject of matter of Example 3 can optionally include the unlocking mechanism being selected from a group of unlocking mechanisms comprising a one-time password, a biometric identification of a user, and a multi-factor authentication process.

In Example 5, the subject of matter of any one of Examples 1-4 can optionally include the instructions that when executed by the at least one processor further cause the at least one processor to determine a type of data indicated by the request for the private data item, where the private data item in the data store is associated with the type of data and a service provided by the server.

In Example 6, the subject of matter of any one of Examples 1-5 can optionally include the private data item in the data store being associated with at least one of the client device, a user of the client device, and a client application executing on the client device.

In Example 7, the subject of matter of any one of Examples 1-6 can optionally include the private data item being a password.

In Example 8, the subject of matter of any one of Examples 1-7 can optionally include the private data item not being provided to the server when the authorization information is not valid.

In Example 9, the subject of matter of any one of Examples 1-8 can optionally include the object being a HyperText Markup Language (HTML) web page.

In Example 10, the subject of matter of Example 9 can optionally include the instructions that when executed by the at least one processor further cause the at least one processor to obtain the private data item from the data store, complete the HTML web page by inserting the private data item into the HTML web page when the valid authorization information is received, and send a response to the server based on the completed HTML web page.

In Example 11, the subject of matter of any one of Examples 1-10 can optionally include the data store including a plurality of sets of one or more private data items, where the plurality of sets are respectively associated with a plurality of services.

In Example 12, the subject of matter of any one of Examples 1-10 can optionally include the proxy including a plurality of sets of data, each one of the plurality of sets of data being associated with at least one network agent, where each set of data includes one or more sets of at least one private data item, and where the one or more sets of at least one private data item of a particular set of data are associated respectively with different services.

In Example 13, the subject of matter of any one of Examples 1-12 can optionally include the client device being selected from a group of client devices comprising a computing device configured to enable a user to access the server via a browser, a computing device including a client application configured to automatically authenticate to a service provided by the server, and an embedded controller configured to automatically authenticate to the service provided by the server.

In Example 14, the subject of matter of any one of Examples 1-13 can optionally include the instructions that when executed by the at least one processor further cause the at least one processor to intercept another network flow en route from the server to the client device, identify a request to change one or more credentials corresponding to one or more particular private data items associated with a particular service provided by the server, select one or more new credentials without forwarding the network flow to the client device, and update the one or more particular private data items in the data store with the one or more new credentials.

In Example 15, the subject of matter of any one of Examples 1-14 can optionally include the instructions being configured for execution in a trusted execution environment on the client device.

In Example 16, the subject of matter of any one of Examples 1-14 can optionally include the at least one machine readable storage medium being implemented in a proxy that is separate from the client device.

Example 17 is an apparatus for protecting data, the apparatus comprising: at least one memory element; at least one processor coupled to the at least one memory element; a modification module that when executed by the at least one processor is configured to: identify a request for a private data item in an object of a network flow intercepted by the apparatus when the network flow was en route from a server to a client device; identify the private data item in a data store; and provide, to the client device, a modified object including an authorization request; and a response module that when executed by at least one processor is configured to send the private data item to the server when valid authorization information is received.

In Example 18, the subject matter of Example 17 can optionally include the response module being further configured to receive authorization information from the client device, determine whether the authorization information is valid, and obtain t e private data item if the authorization information is determined to be valid.

In Example 19, the subject matter of any one of Examples 17-18 can optionally include the modification module being further configured to determine an unlocking mechanism for the private data item, and create the modified object including the authorization request based, at least in part, on the unlocking mechanism.

In Example 20, the subject matter of Example 19 can optionally include the unlocking mechanism being selected from a group of unlocking mechanisms comprising a one-time password, a biometric identification of a user, and a multi-factor authentication process.

In Example 21, the subject matter of any one of Examples 17-20 can optionally include the modification module being further configured to determine a type of data indicated by the request for the private data item, where the private data item in the data store is associated with the type of data and a service provided by the server.

In Example 22, the subject matter of any one of Examples 17-21 can optionally include the private data item in the data store being associated with at least one of the client device, a user of the client device, and a client application executing on the client device.

In Example 23, the subject matter of any one of Examples 17-22 can optionally include the private data item being a password.

In Example 24, the subject matter of any one of Examples 17-23 can optionally include the private data item not being provided to the server when the authorization information is not valid.

In Example 25, the subject matter of any one of Examples 17-24 can optionally include the object being a HyperText Markup Language (HTML) web page.

In Example 26, the subject matter of Example 25 can optionally include the response module being further configured to obtain the private data item from the data store when the valid authorization information is received, complete the HTML web page by inserting the private data item into the HTML web page when the valid authorization information is received, and send a response to the server based on the completed HTML web page.

In Example 27, the subject matter of any one of Examples 17-26 can optionally include the data store including a plurality of sets of one or more private data items, the plurality of sets respectively associated with a plurality of services.

In Example 28, the subject matter of any one of Examples 17-26 can optionally include the proxy including a plurality of sets of data, each set of the plurality of sets of data associated with at least one network agent, where each set of data includes one or more sets of at least one private data item, and where the one or more sets of at least one private data item of a particular set of data are associated respectively with different services.

In Example 29, the subject matter of any one of Examples 17-28 can optionally include the client device being selected from a group of client devices comprising a computing device configured to enable a user to access the server via a browser, a computing device including a client application configured to automatically authenticate to a service provided by the server, and an embedded controller configured to automatically authenticate to the service provided by the server.

In Example 30, the subject matter of any one of Examples 17-29 can optionally include the modification module being further configured to intercept another network flow en route from the server to the client device, identify a request to change one or more credentials corresponding to one or more particular private data items associated with a particular service provided by the server, select one or more new credentials without forwarding the network flow to the client device, and update the one or more particular private data items in the data store with the one or more new credentials.

In Example 31, the subject matter of any one of Examples 17-30 can optionally include apparatus comprising the client device, where the client device includes a trusted execution environment, and where the modification module and the response module are executed only in the trusted execution environment.

In Example 32, the subject matter of any one of Examples 17-30 can optionally include the apparatus being a proxy that is separate from the client device.

Example 33 is a method for protecting private data that comprises: intercepting, by a proxy, a network flow en route from a server to a client device; identifying a request for a private data item in an object of the network flow; identifying the private data item in a data store; providing, to the client device, a modified object including an authorization request; and sending the private data item to the server when valid authorization information is received.

In Example 34, the subject matter of Example 33 can optionally include receiving authorization information from the client device, determining whether the authorization information is valid, and obtaining the private data item if the authorization information is determined to be valid.

In Example 35, the subject matter of any one of Examples 33-34 can optionally include determining an unlocking mechanism for the private data item, and creating the modified object including the authorization request based, at least in part, on the unlocking mechanism.

In Example 36, the subject matter of Example 35 can optionally include the unlocking mechanism being selected from a group of unlocking mechanisms comprising a one-time password, a biometric identification of a user, and a multi-factor authentication process.

In Example 37, the subject matter of any one of Examples 33-36 can optionally include determining a type of data indicated by the request for the private data item, where the private data item in the data store is associated with the type of data and a service provided by the server.

In Example 38, the subject matter of any one of Examples 33-37 can optionally include the private data item in the data store being associated with at least one of the client device, a user of the client device, and a client application executing on the client device.

In Example 39, the subject matter of any one of Examples 33-38 can optionally include the private data item being a password.

In Example 40, the subject matter of any one of Examples 33-39 can optionally include the private data item not being provided to the server when the authorization information is not valid.

In Example 41, the subject matter of any one of Examples 33-40 can optionally include the object being a HyperText Markup Language (HTML) web page.

In Example 42, the subject matter of Example 41 can optionally include obtaining the private data item from the data store when the valid authorization information is received, completing the HTML web page by inserting the private data item into the HTML web page when the valid authorization information is received, and sending a response to the server based on the completed HTML web page.

In Example 43, the subject matter of any one of Examples 33-42 can optionally include the data store including a plurality of sets of one or more private data items, the plurality of sets respectively associated with a plurality of services.

In Example 44, the subject matter of any one of Examples 33-42 can optionally include the proxy including a plurality of sets of data, each set of the plurality of sets of data associated with at least one network agent, where each set of data includes one or more sets of at least one private data item, and where the one or more sets of at least one private data item of a particular set of data are associated respectively with different services.

In Example 45, the subject matter of any one of Examples 33-44 can optionally include the client device being selected from a group of client devices comprising a computing device configured to enable a user to access the server via a browser, a computing device including a client application configured to automatically authenticate to a service provided by the server, and an embedded controller configured to automatically authenticate to the service provided by the server.

In Example 46, the subject matter of any one of Examples 33-45 can optionally include intercepting another network flow on route from the server to the client device, identifying a request to change one or more credentials corresponding to one or more particular private data items associated with a particular service provided by the server, selecting one or more new credentials without forwarding the network flow to the client device, and updating the one or more particular private data items in the data store with the one or more new credentials.

In Example 47, the subject matter of any one of Examples 33-46 can optionally include the identifying the request for the private data item, the identifying the private data item in the data store, and the providing the modified object to the client device being performed in a trusted execution environment on the client device.

In Example 48, the subject matter of any one of Examples 33-46 can optionally include the proxy being separate from the client device.

Example 49 is an apparatus for protecting private data, the apparatus comprising means for performing the method of any one of Examples 33-48.

In Example 50, the subject matter of Example 49 can optionally include the means for performing the method comprising at least one processor and at least one memory element.

In Example 51, the subject matter of Example 50 can optionally include the at least one memory element comprising machine readable instructions that when executed, cause the apparatus to perform the method of any one of Examples 33-48.

In Example 52, the subject matter of any one of Examples 49-51 can optionally include the apparatus being a computing device.

Example 53 is at least one machine readable storage medium comprising instructions for protecting private data, where the instructions when executed implement a method or realize an apparatus as recited in any one of Examples 17-48.

Example 54 is an apparatus for protecting private data, the apparatus comprising: means for intercepting, by a proxy, a network flow en route from a server to a client device; means for identifying a request for a private data item in an object of the network flow; means for identifying the private data item in a data store; means for providing, to the client device, a modified object including an authorization request; and means for sending the private data item to the server when valid authorization information is received.

What is claimed is:

1. At least one non-transitory machine-readable storage medium having instructions stored thereon for protecting private data, wherein the instructions, when executed by at least one processor, cause the at least one processor to:
   intercept, by a proxy of a trusted execution environment, a network flow en route from a server to a client device, wherein the proxy is implemented via software signed by a manufacturer of the client device;
   identify a request for a private data item in an object of the network flow;
   identify the private data item in a data store of the trusted execution environment;
   determine an unlocking mechanism for the private data item, wherein the unlocking mechanism is selected from a group of unlocking mechanisms consisting of: a one-time password, a biometric identification of a user, and a multi-factor authentication process;
   provide, to the client device, a modified object including an authorization request, wherein the object is a HyperText Markup Language (HTML) web page;
   receive authorization information from the client device; and
   send the private data item from the proxy to the server if the authorization information is determined, based on the unlocking mechanism, to be valid, wherein the proxy is only run inside the trusted execution environment, and only digitally signed code is configured to run inside the trusted execution environment.

2. The at least one machine-readable storage medium of claim 1, wherein the instructions, when executed by the at least one processor, cause the at least one processor to:
   create the modified object including the authorization request based, at least in part, on the unlocking mechanism.

3. The at least one machine-readable storage medium of claim 1, wherein the instructions, when executed by the at least one processor, cause the at least one processor to:
   determine data indicated by the request for the private data item, wherein the private data item in the data store is associated with the data and a service of the server.

4. The at least one machine-readable storage medium of claim 1, wherein the private data item in the data store is associated with at least one of a user of the client device or a client application for executing on the client device.

5. The at least one machine-readable storage medium of claim 1, wherein the private data item is a password.

6. The at least one machine-readable storage medium of claim 1, wherein the private data item is not provided to the server when the authorization information is not valid.

7. The at least one machine-readable storage medium of claim 1, wherein the instructions, when executed by the at least one processor, cause the at least one processor to:
   obtain the private data item from the data store;
   complete the HTML web page by inserting the private data item into the HTML web page when the authorization information is received; and
   send a response to the server based on the HTML web page.

8. The at least one machine-readable storage medium of claim 1, wherein the data store includes a plurality of sets of one or more private data items, the plurality of sets respectively associated with a plurality of services.

9. The at least one machine-readable storage medium of claim 1, wherein the data store includes a plurality of sets of data, each set of the plurality of sets of data associated with at least one network agent, each set of data includes one or more sets of at least one private data item, and the one or more sets of at least one private data item of a particular set of data are associated respectively with different services.

10. A method for protecting private data, the method comprising:
    intercepting, by a proxy of a trusted execution environment, a network flow en route from a server to a client device, wherein the proxy is implemented via software signed by a manufacturer of the client device;
    identifying a request for a private data item in an object of the network flow;
    identifying the private data item in a data store of the trusted execution environment;
    determining an unlocking mechanism for the private data item, wherein the unlocking mechanism is selected from a group of unlocking mechanisms consisting of: a one-time password, a biometric identification of a user, and a multi-factor authentication process;
    providing, to the client device, a modified object including an authorization request, wherein the object is a HyperText Markup Language (HTML) web page;

receiving authorization information from the client device; and sending the private data item from the proxy to the server if the authorization information is determined, based on the unlocking mechanism, to be valid, wherein the proxy is only run inside the trusted execution environment, and only digitally signed code is configured to run inside the trusted execution environment.

11. The at least one machine-readable storage medium of claim 1, wherein the instructions, when executed by the at least one processor, cause the at least one processor to:

intercept another network flow en route from the server to the client device;

identify a request to change one or more credentials corresponding to the private data item associated with a service of the server;

select one or more new credentials without forwarding the other network flow to the client device; and update the private data item in the data store with the one or more new credentials.

12. The at least one machine-readable storage medium of claim 1, wherein the trusted execution environment is on the client device.

13. The at least one machine-readable storage medium of claim 1, wherein the at least one machine readable storage medium is implemented in a proxy that is separate from the client device.

14. An apparatus for protecting data, the apparatus comprising:

at least one memory element;

at least one processor coupled to the at least one memory element;

a modification module that, when executed by the at least one processor, is to identify a request for a private data item in an object of a network flow intercepted by a proxy of a trusted execution environment of the apparatus, when the network flow is en route from a server to a client device, wherein the proxy is implemented via software signed by a manufacturer of the apparatus;

identify the private data item in a data store of the trusted execution environment;

determine an unlocking mechanism for the private data item, wherein the unlocking mechanism is selected from a group of unlocking mechanisms consisting of: a one-time password, a biometric identification of a user, and a multi-factor authentication process; and provide, to the client device, a modified object including an authorization request, wherein the object is a HyperText Markup Language (HTML) web page; and a response module that, when executed by at least one processor, is to receive authorization information from the client device; and send the private data item from the proxy to the server if the authorization information is determined, based on the unlocking mechanism, to be valid, wherein the modification module and the response module are included in the proxy and are executed only inside the trusted execution environment, and only digitally signed code is configured to run inside the trusted execution environment.

15. The apparatus of claim 14, wherein the modification module, when executed by the at least one processor, is to:

create the modified object including the authorization request based, at least in part, on the unlocking mechanism.

16. The apparatus of claim 14, wherein the modification module, when executed by the at least one processor, is to:

determine data indicated by the request for the private data item, wherein the private data item in the data store is associated with the data and a service of the server.

17. The apparatus of claim 14, wherein the apparatus is the client device, and the client device includes the trusted execution environment.

18. The apparatus of claim 14, wherein the apparatus is a device that is separate from the client device.

19. The method of claim 10, wherein the client device is selected from a group of client devices consisting of:

a computing device to enable a user to access the server via a browser;

a computing device including a client application to automatically authenticate to a service of the server; and an embedded controller to automatically authenticate to the service of the server.

20. The method of claim 10, wherein the private data item in the data store is associated with at least one of a user of the client device or a client application for executing on the client device.

21. The method of claim 10, wherein the data store includes a plurality of sets of one or more private data items, the plurality of sets respectively associated with a plurality of services.

22. The at least one machine-readable storage medium of claim 1, wherein the unlocking mechanism is the biometric identification, and the biometric identification uses a fingerprint, an eye retina or iris, a voice, or a face.

23. The method of claim 10, further comprising:

determining an identifier for the client device, based on a determination that the object contains the request for the private data item.

24. The method of claim 10, further comprising:

identifying the private data item, based on an association with the server and a client application.

* * * * *